Feb. 18, 1941.  W. J. GUILD  2,232,660
TOOLHEAD
Filed April 10, 1939   2 Sheets-Sheet 1
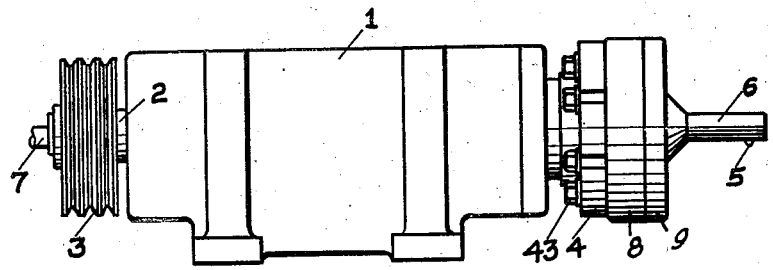
Fig. 1
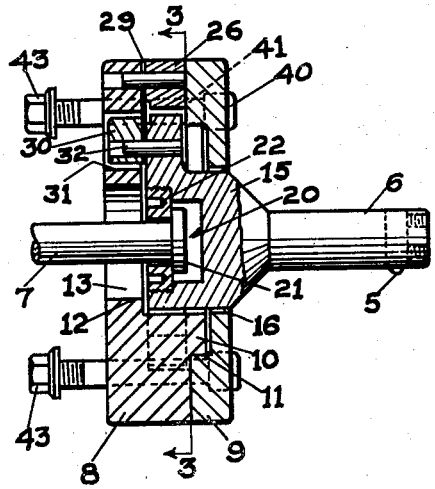
Fig. 2  Fig. 3
Fig. 4
Inventor
Waldo J. Guild
By Geo. W. Kennedy Jr.
Attorney Feb. 18, 1941. W. J. GUILD 2,232,660
TOOLHEAD
Filed April 10, 1939 2 Sheets-Sheet 2

Inventor
Waldo J. Guild
By Geo. H. Kennedy
Attorney

Patented Feb. 18, 1941

2,232,660

UNITED STATES PATENT OFFICE 2,232,660

TOOLHEAD

Waldo J. Guild, Worcester, Mass., assignor to The Heald Machine Company, Worcester, Mass., a corporation of Massachusetts Application April 10, 1939, Serial No. 267,034

11 Claims. (Cl. 77—3)

The present invention relates to toolheads and primarily to a toolhead construction for boring machines which will provide for a retraction of the boring tool at the end of each boring operation.

Many different types of toolheads which provide for a retraction of the tool at the completion of the boring operation have been developed, as shown for instance in the Schmidt Patent No. 2,058,359, dated October 20, 1936, or the Longley Patent No. 1,794,080, dated February 24, 1931. These devices are in general satisfactory, but the desired result is naturally a toolhead which will provide for a tool retraction by a relatively simple structure and which will, at the same time, assure accuracy in finished size of the bored workpieces. The principal object of the present invention is the development of a toolhead for boring machines which will provide the desired retraction in a relatively simple manner. At the same time the structure of the present invention assures a positive and accurate positioning of the boring tool for the boring operation so that successively bored workpieces may all be finished to the desired diameter.

Other and further objects and advantages of the invention will appear from the following detailed description taken in connection with the accompanying drawings in which—

Fig. 1 is a side elevation of a toolhead embodying the invention.

Fig. 2 is a sectional view along the line 2—2 of Fig. 3, showing the mechanism which provides for the tool retraction.

Fig. 3 is a sectional view along the line 3—3 of Fig. 2.

Fig. 4 is a sectional view along the line 4—4 of Fig. 3.

Like reference characters refer to like parts in the different figures.

Figure 5:
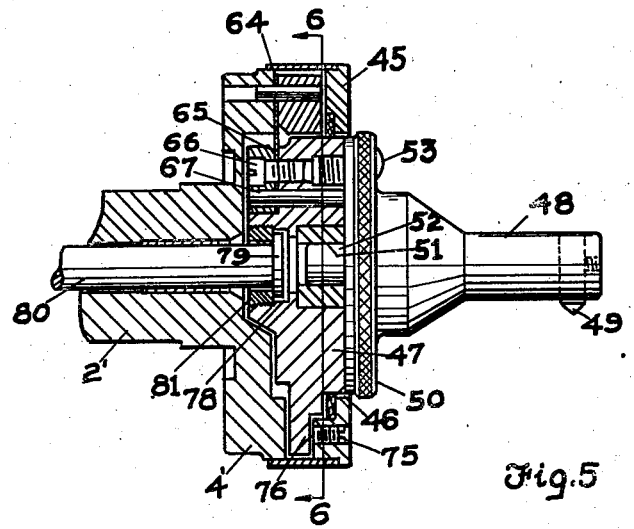
Fig. 5 is a sectional view corresponding to Fig. 2 and showing a modification.
Figure 6:
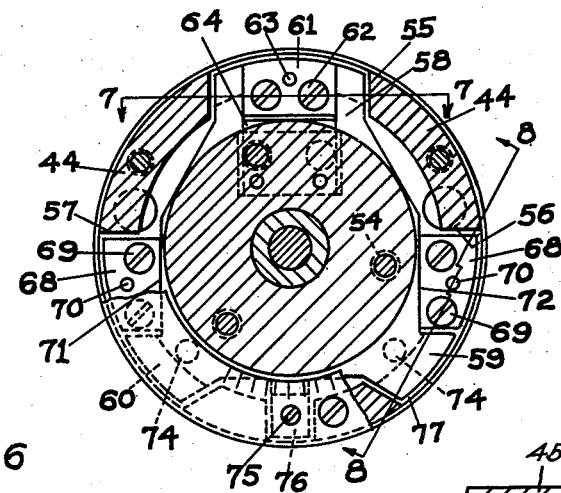
Fig. 6 is a sectional view along the line 6—6 of Fig. 5.
Figure 7:
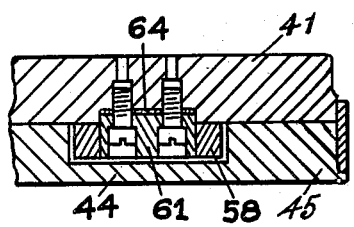
Fig. 7 is a sectional view along the line 7—7 of Fig. 6.

Referring first to Fig. 1, the toolhead comprises a housing 1 having a spindle 2 journalled therein. Suitable bearings, not shown, are provided for assuring a vibrationless rotation of the spindle within the housing. A pulley 3 on one end of the spindle provides for the rotation thereof and the other end of the spindle has a face plate 4 on which is mounted the boring tool 5, together with its supporting quill 6 and the tool retracting mechanism, hereinafter described in detail. The spindle 2 is hollow and has an axially extending rod 7 slidably arranged therein, this rod being utilized for effecting the positioning and retraction of the boring tool.

Referring to Figs. 2 and 3, the structure which provides the tool retraction, and also supports the quill 6, comprises a body member 8 and a cap 9. The body member 8 is in the form of an annulus having a centrally positioned boss 10 on one side thereof to engage in a corresponding recess 11 in the cap 9. The body member also has an inwardly extending flange 12 defining a central opening 13 through the member. On the same side of the member 8 as the centrally extending boss 10 are three radially extending slots 14 and 14'.

The quill 6 which has a base portion 15 somewhat larger in diameter than the portion of the quill that supports the boring tool is positioned within the annular member 8, the cap 9 having a central opening 16 through which the quill extends. The quill has radially extending arms 17 and 18 which are located in the slot 14 and slots 14' respectively. The inner surfaces of the arms 18, 18 at the outer ends thereof are accurately finished to provide locating surfaces 19, Fig. 4, engaging with correspondingly accurately finished surfaces at the bases of the slots 14'. The inner surface of the quill has a central recess 20 to receive the end of the rod 7 which has a head 21, the latter being held in the recess 20 by a locating ring 22.

The arm 17, which extends into the notch 14, has parallel side walls 23 and 24 engaging respectively with one wall 25 of the notch and with the side of a block 26 positioned in the notch and held therein by a pin 27 and a clamping bolt 28. A flexible strip 29 is clamped between the block 26 and the base of the notch and is also clamped against the under side of a part of the arm 17 by a block 30 received in a suitable opening 31 in the member 8. The block 30 is secured to the arm 17 by a locating pin 32 and a clamping bolt 33. The flexible strip 29 provides a hinge connection between the member 8 and the quill.

Each of the arms 18 on the quill has an accurately finished surface 34 parallel to the surfaces 23 and 24 on the arm 17 and these surfaces engage with blocks 35 positioned in the notches 14' and having correspondingly finished surfaces 35'. The blocks 35 are held in the notches 14' by locating pins 36 and clamping screws 37. It will be apparent that the outer ends of the arms 18 are narrowed to extend between the blocks 35 and the opposite side walls of the notches 14'. Each of the arms 18 has a small recess 38 on its inner surface to receive a coil spring 39, these springs tending to rock the quill counterclockwise, Fig. 2 about the axis of the hinge connection provided by the strip 29.

With the cap 9 in position, the assembled structure is secured to the face plate 4 by bolts 40 which extend through openings 41 in the cap and openings 42 in the member 8. It will be noted that these bolts are positioned so that they will not interfere with the operation of the tool retracting mechanism. Clamping nuts 43 applied to the bolts serve to hold the device on the face plate. When the boring tool 5 is in operative position, the parts are in the positions shown in Figs. 2 and 4. Under these conditions the rod 7 is being urged to the left by any suitable mechanism, such as a coil spring, a fluid pressure mechanism, or other manually or automatically controlled means, thereby holding the accurately finished surfaces 19 against the bases of the slots 14' and holding the quill 6 securely against movement relative to the body member 8 and to the face plate. In this position of the members the boring tool will bore an opening corresponding in radius to the spacing of the cutting point of the tool 5 from the axis of rotation of the spindle and quill.

After each boring operation, to obtain retraction of the tool 5 so that it can be withdrawn through the workpiece bore without leaving any scratch or mark thereon, the tension of the rod 7 is relieved to allow the springs 39, Fig. 4, to move the arms 18 to the right, Figs. 2 and 4, into engagement with the cap 9. The hinge connection between the arm 17 and the member 8 provided by the flexible strip 29 allows the quill to rock under this action of the springs 39 an amount sufficient to provide a slight inward movement of the boring tool 5 relative to the axis of spindle 2. Thus with the spindle at rest the tool, having been so retracted, may be withdrawn through the finished bore without danger of touching or scratching the surface thereof. As the quill rocks relative to the body member 8, the surfaces 23 and 24 on the arm 17 and the surfaces 34 on the arms 18 serve as guide surfaces to assure a return movement of the quill always to the same operative position each time that tension is exerted on the rod 7 to obtain movement of the boring tool 5 into operative boring position.

With reference now to Figs. 5 to 8 inclusive, the device therein shown incorporates the same features as that of Figs. 1 to 4, with the added feature of adjustment for the size of the opening being bored other than by an adjustment of the boring tool within its quill as is necessary in the structure of Figs. 1 to 4. In the structure of Figs. 5 to 8, the adjustment of the cutting point of the tool relative to its axis is obtained by turning the quill relative to the supporting structure, as will be pointed out.

As shown in Fig. 5, the structure for supporting the quill and for providing a retraction of the tool is mounted, in this particular instance, directly on a face plate 4' which functions as an integral part of a spindle 2'. The latter may be mounted in a housing corresponding to the housing 1. In this particular arrangement, the face plate 4' also incorporates thereon the structure corresponding to that of the body member 8 in the structure of Figs. 1 to 8 inclusive.

The face plate 4' is engaged by spaced rearwardly extending lugs 44 on a cap 45 secured to said face plate. The cap has a central opening 46 within which is positioned a member 47 on which a quill 48 is mounted. The quill has a laterally extending boring tool 49 in the outer end thereof and, on the inner end, a flange 50 engaging with the member 47. The latter has a central opening 51 concentric to the axis of the spindle 2' to receive a pilot pin 52 projecting rearwardly from the quill in slightly eccentric relation thereto. Thus a turning movement of the quill on the member 47 provides for adjusting the spacing of the cutting point of the boring tool 49 relative to the axis of rotation of the quill. Suitable bolts 53 extend through slots, not shown, in the flange 50 and engage in bores 54 in the member 47 to hold the quill in adjusted position.

The lugs 44 on the cap define spaced recesses 55, 56 and 57 which receive radially extending arms 58, 59 and 60 respectively on the member 47. The arm 58 is bifurcated and receives therebetween a block 61 which is clamped to the member 4' by bolts 62 and held in position by a pin 63. A flexible strip 64 is clamped between the block 61 and the base of the recess 55 and this strip extends inwardly to be clamped between the underside of the member 47 and a block 65 secured to the member 47 by clamping bolts 66. Pins 67 aid in locating the block 65 on the member 47. The opposite sides of the block 61 are accurately finished and the inside surfaces of the bifurcations of the arm 58 are similarly finished so that the block acts as a guide for the movement of the member 47 relative to the face plate 4'. The flexible strip 64 acts as a hinge for this rocking movement.

Each of the notches 56 and 57 has a block 68 therein, the same being secured to plate 4' by clamping screws 69, and further located by pins 70. The inner surfaces of these blocks are finished to engage with parallel surfaces 71 and 72 on the member 47, thereby further guiding the movement of the member 47 relative to the face plate 4'.

Figure 8:
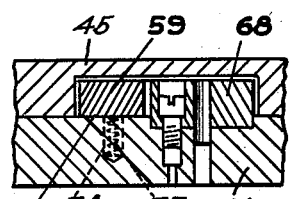
Fig. 8 is a sectional view along the line 8—8 of Fig. 6.

As best shown in Fig. 8, coil springs 73 are positioned in recesses 74 in the face plate in a position to engage the inner or rear surfaces of the arms 59 and 60 for moving these arms forwardly (toward the right, Fig. 5). The cap 45 has an adjusting screw 75 for engagement with a projecting lug 76 on the member 47, this lug being positioned opposite to the hinge connection between the member 47 and the face plate. Adjustment of the set screw 75 limits the swinging movement of the member 47 away from the face plate under the action of the springs 73.

The inner faces of the arms 59 and 60 have accurately finished surfaces adapted to engage with correspondingly finished surfaces 77 on the face plate, and these surfaces aid in locating the member 47 in predetermined relation to the face plate when the member is pulled tightly against the face plate. For so shifting the member 47 to place the boring tool in operative cutting position, the member 47 has a central opening 78 to receive the headed end 79 of a rod 80 extending axially through the spindle 2', this head being held in the opening 78 by a threaded collar 81.

During the boring operation tension is exerted on the rod 80 (as on the rod 7) to move the latter to the left, Fig. 5, thereby holding the member 47 tightly against the face plate, the latter's surfaces 77 cooperating with the arms 59 and 60 to position the member in the desired relation to the face plate. In this position the boring tool is held in operative position for boring the workpiece to the desired dimension. After the boring is completed, and prior to withdrawal of the tool from the workpiece bore, the tension on the rod 80 is relieved whereupon the springs 73 cause a slight rocking movement of the member 47 relative to the face plate, thereby providing for a slight radial retraction or inward movement of the boring tool relative to spindle axis. In this way the boring tool is positioned so that it will not engage with the bored surface while the tool is being withdrawn from the workpiece.

It will be apparent that, in the structures shown in Figs. 1 to 4, and also in Figs. 5 to 8, the rotation of the boring spindle has no effect whatever on the retraction of the boring tool, since the retraction takes place independently of the spindle rotation. The movement of the boring tool is a radially inward movement so that the cutting point of the tool is closer to the spindle axis when the retraction has been effected. The retractile movement is a rocking movement about the axis on which the quill is turnable; this axis is substantially at right angles to the axis of rotation of the spindle.

I claim:

1. In a toolhead, a housing, a spindle journalled therein, a member mounted on the spindle for rocking about an axis substantially at right angles to the axis of rotation of the spindle, said member having a projecting shaft in which a cutting tool is positioned, cooperating means on the spindle and member for limiting the rocking movement of said member in one direction to determine the operative position of the tool, a rod axially slidable in the spindle, and connections between said rod and member for procuring rocking movement of said member in one direction about its axis by axial movement of the rod.

2. In a toolhead, a housing, a spindle journalled therein, a member mounted on the spindle for rocking about an axis substantially at right angles to the axis of rotation of the spindle, said member having a projecting shaft in which a cutting tool is positioned, cooperating means on the spindle and member for limiting the rocking movement of said member in one direction to determine the operative position of the tool, a rod axially slidable in the spindle, connections between said rod and member for procuring rocking movement of said member in one direction about its axis by axial movement of the rod, and resilient means for rocking said member in the opposite direction upon release of the rod.

3. In a toolhead, a housing, a spindle journalled therein, a member mounted on the spindle for rocking about an axis substantially at right angles to the axis of the spindle, a quill having a projecting shaft in which a cutting tool is positioned, said quill being releasably mounted on the member, cooperating means on the spindle and member for limiting the rocking movement of said member in one direction to determine the operative position of the tool, a rod axially slidable in the spindle and connections between said rod and member for procuring rocking movement of said member about its axis by axial movement of the rod.

4. In a toolhead, a housing, a spindle journalled therein, a member mounted on the spindle for rocking about an axis substantially at right angles to the axis of the spindle, a quill having a projecting shaft in which a cutting tool is positioned, said quill being releasably mounted on the member, cooperating means on the spindle and member for limiting the rocking movement of said member in one direction to determine the operative position of the tool, a rod axially slidable in the spindle and connections between said rod and member for procuring rocking movement of said member in one direction about its axis by axial movement of the rod, and resilient means for rocking said member in the opposite direction upon release of the rod.

5. In a toolhead, a housing, a spindle journalled therein, a cutting tool, a member mounted on said spindle for rocking movement about an axis substantially at right angles to the spindle axis, a quill having the cutting tool thereon and releasably mounted on said member, a rod extending axially through said spindle, and connections between said member and rod for procuring movement of the member, and thereby movement of the tool relative to the spindle axis, by axial movement of the rod.

6. In a toolhead, a housing, a spindle journalled therein, a cutting tool, a member mounted on said spindle for rocking movement about an axis substantially at right angles to the spindle axis, a quill having the cutting tool thereon and releasably mounted on said member, said quill having its axis slightly eccentric to the axis of the spindle and being angularly adjustable on said member for adjusting the radial position of the tool relative to the spindle axis, a rod extending axially through said spindle, and connections between said member and rod for procuring rocking movement of the member about its axis, and thereby movement of the tool relative to the spindle axis, by axial movement of the rod.

7. In a toolhead, a housing, a spindle journalled therein, said spindle having a face plate on one end thereof, and a retracting mechanism removably mounted on said spindle, said retracting mechanism comprising a base secured to said face plate, a member hinged to said base for rocking movement about an axis substantially at right angles to the axis of the spindle, said member having a cutting tool mounted thereon, cooperating means on the member and base at points remote from the spindle axis for limiting the turning movement of the member in one direction for determining the operative position of the tool, a rod axially movable in the spindle and connecting means between said member and rod for moving said member into a position where said cooperating means are operative.

8. In a toolhead, a housing, a spindle journalled therein, said spindle having a face plate on one end thereof, and a retracting mechanism removably mounted on said spindle, said retracting mechanism comprising a base secured to said face plate, a member hinged to said base for rocking movement about an axis substantially at right angles to the axis of the spindle, said member having a cutting tool mounted thereon, cooperating means on the member and base at points remote from the spindle axis for limiting the turning movement of the member in one direction for determining the operative position of the tool, said spindle having a rod axially slidable therethrough and means connecting said rod and said member for holding said member in such a position that the cooperating means are operative.

9. In a toolhead, a housing, a spindle journalled therein, and having a face plate on one end thereof, a member hinged to said face plate for turning movement about an axis substantially at right angles to the axis of the spindle, a cutting tool carried by said member and remote from the axis of the spindle, cooperating means on the face plate and member for limiting the turning movement of the member in one direction, thereby determining the operative position of the cutting tool, and a rod axially movable in the spindle and connected to said member for turning said member into a position where the cooperating means are operative.

10. In a toolhead, a housing, a spindle journalled therein, said spindle having a face plate on one end thereof, a member mounted on the face plate and having a projecting stub shaft in the end of which a cutting tool is positioned, hinge means for supporting the member on the face plate for turning movement about an axis at right angles to and spaced from the axis of the spindle, cooperating means on the face plate and member at points remote from the hinge means and also remote from the spindle axis for limiting the turning movement of the member in one direction and thereby determining the operative position of the tool, a rod axially movable in the spindle, and a connection between said rod and the member for movement of the member into a position where said cooperating means are operative by axial movement of the rod.

11. In a toolhead, a housing, a spindle journalled therein, said spindle having a face plate on one end thereof, a supporting member releasably mounted on the face plate, a tool member having a projecting stub shaft in the end of which a cutting tool is positioned, hinge means connecting the tool carrying member to the supporting member for turning movement of the carrying member about an axis at right angles to and spaced from the axis of the spindle, cooperating means on said members at points remote from the hinge means and also remote from the spindle axis for limiting the turning movement of the carrying member in one direction and thereby determining the operative position of the tool, a rod axially movable in the spindle, and a connection between said rod and the tool carrying member for movement of the latter member into a position where said cooperative means are operative by axial movement of the rod.

WALDO J. GUILD.